United States Patent Office 3,547,887
Patented Dec. 15, 1970

---

3,547,887
**METHOD FOR PRODUCING HEAT-RESIST-
ANT LINEAR THERMOPLASTIC ARO-
MATIC POLYTHIOETHERS**
Rudolf Gabler, Uitikon, and Josef Studinka, Zurich, Switzerland, assignors to Inventa A.G. für Forschung und Patentverwertung, Zurich, Switzerland, a corporation of Switzerland
No Drawing. Filed June 5, 1968, Ser. No. 734,542
Claims priority, application Switzerland, June 9, 1967, 8,200/67
Int. Cl. C08g 33/10
U.S. Cl. 260—47    6 Claims

ABSTRACT OF THE DISCLOSURE

An aromatic polythioether polymer having the formula

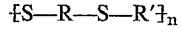

wherein R and R' are bivalent residues of aromatic compounds and $n$ is a whole number is prepared. An alkali metal salt of a dinuclear aromatic dithiol having the formula

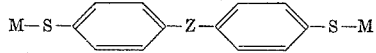

wherein M is Li, Na, K and Z is —O—, —S—, —CH$_2$— or —C(CH$_3$)$_2$—, is reacted with a non-activated single or multiple nuclear aromatic dihalogen compound having at least 3 carbon atoms between the halogen atoms. The reaction is conducted in N-methyl pyrrolidone, sulfolane (tetrahydro thiophen-1,1-dioxide), dimethylacetamide, hexamethyl phosphoramide, or dimethylsulphoxide, and at a temperature of 180°–300° C.

---

The object of the present invention is a method for producing heat-resistant, linear, thermoplastic, aromatic polythioethers.

Because of their outstanding heat stability, pure aromatic polythioethers are of a great technical and industrial interest. There are many ways of producing them, but so far none of these have resulted in a technically usable process. The reaction of mono- and dihalogen compounds with sulphur and alkali according to Macallum (U.S. Pats. 2,513,188 and 2,538,941) results in low-molecular, branched, and in part cross-linked products (Lenz et al., J. Pol. Sci., 58 (1962) 351). Similar products are obtained when sodium sulphite is reacted with dichlorbenzene (British Pat. 1,056,226).

Predominantly linear, high-molecular polythioethers were obtained by Lenz and collaborators (German Pat. 1,190,193) by heating metal salts of p-halogenthiophenols. But this again does not prevent the formation of cross-linked products, and an inconvenient extraction process leading to losses is neccesary. Another method of producing aromatic polythioethers consists in reacting dithiohydroquinones with dicholorodiphenylsulphone in alcohol solvents (U.S. Pat. 2,822,351). However, this produces only low-molecular products.

The only method whereby pure linear, colourless polythioethers with molecular weights greater than 15,000 can be produced consists in reacting dinuclear aromatic dithiols with activated aromatic dihalogen compounds in highly polar solvents, activation of the halogen atoms being effected by the presence of electron-attracting groups in the ortho or para positions in relation to the halogen.

It has now been found that pure, linear, heat-resistant, thermoplastic aromatic polythioethers of the general structural formula:

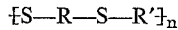

wherein R and R' are dinuclear aromatic residues and $n$ is a whole number, are obtained when alkali metal or alkaline earth metal salts of an aromatic dithiol are reacted with an unactivated aromatic dihalogen compound having at least three carbon atoms between the halogen atoms, in a polar solvent, at a high temperature and, if necessary, in the presence of catalysts.

The alkali metal salts of a double-iuclear aromatic dithiol are preferred. Examples of these preferred compounds include those of formula:

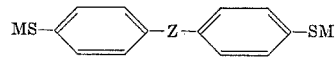

wherein M is an alkali metal, e.g. Li, Na, or K, and Z is a single bond or a bivalent bonding member, e.g. —O—, —S—, —CH$_2$—, or —C(CH$_3$)2—. The following for example, are specific representatives of this class of compounds:

the disodium salt of diphenyletherdithiols
the dipotassium salt of diphenylsulphidedithiols
the dilithium salt of diphenylmethanedithiols
the disodium salt of 4,4-dimercaptodiphenyls.

Suitable dihalogen compounds include those of the common structural formulae X—R—X or X—R—Y, wherein X and Y are halogen atoms, for example, F, Cl, Br, or I, and R is any desired single or multiple-nuclear aromatic residue, in which electron-attracting groups are absent. The following dihalogen compounds belong to these:

1,4-dicholorbenzene
1,4-dibromobenzene
1,3-dibromobenzene
1,4-dichloronaphthalene
4-chloro-4'-bromodiphenyl
4,4-diiododiphenylmethane
4,4-dibromodiphenylether
4,4-dichlorodiphenylsulfide.

Polycondensation of dithiol alkali metal salts with the dihalogen compounds is carried out in a strongly polar, high-boiling-point solvent with intensive exclusion of water and in a protective inert gas atmosphere, if necessary under pressure. Instead of starting with the salts, these may be produced in a first stage of the process from the dithiol and an equivalent amount of aqueous alkali, and subsequent distilling off of water azeotropically or removing it by vacuum distillation. The residual water content should not exceed 0.3% by weight of the amount of salt.

N-methyl-pyrrolidone is outstandingly suitable as the polar solvent, since it has a high boiling point, is sufficiently stable at the boiling temperature, and is a good solvent for the resulting polythioether. Other polar solvents which may be used in the method according to the invention are, for example, sulfolane (tetrahydrothiophen-1,1-dioxide), dimethylacetamide, hexamethylphosphoramide, and dimethylsulphoxide.

The dithiol and the aromatic dihalogen compound are caused to react preferably in equivalent amounts, the alkali halide separating quantitatively. In many cases, it is advisable to use a small excess of 0.1–1.0 mol percent of dithiol, in order to obtain higher molecular weights.

The preferred reaction temperatures are between 180 and 300°, preferably 200–210°. With solvents or dihalogen compounds of lower boiling points, it is therefore necessary to work under pressure.

Although in most cases there is no need to use catalysts, it is advisable in many cases to add 0.05 to 3.0% by weight, in relation to the dithiol of an accelerator. The following are suitable for this purpose: copper, copper oxide or copper salts, for example copper acetate, copper bromide, and copper iodide, as well as compounds containing unstable-bonded bromine, e.g. N-bromo-succinimide and N-bromo-phthalimide.

The polythioethers produced according to the invention are obtained by compressing the solvent or melt in water, which causes solidification. The polymer may be comminuted by grinding or cutting, the alkali salts and solvent residues being removed by extraction with water. After drying, the polythioethers appear as colourless to yellowish granules, softening between 200 and 300° according to the chemical composition.

The polythioethers produced by the present method may be processed on conventional machines, by moulding, injection-moulding, and extrusion, into sheets, filaments, films, rods, tubes, and moulded articles of all kinds. The moulded objects are noted for their high resistance to acids and alkalis. Their high heat-resistance is of special value. For example they do not deteriorate when subjected permanently to temperatures between 140 and 180° in air.

The following examples serve to explain the invention in greater detail:

EXAMPLE 1

14.06 g. (0.06 mol) of diphenylether-4,4'-dithiol, 30 ml. of N-methylpyrrolidone, and 24.98 ml. of 26.96% aqueous caustic potash (0.12 mol KOH) were placed in a 240 ml. three-neck flask equipped with a stirrer, a Dean-Stark attachment, and a gas-inlet tube. For the purpose of removing the water, 70 ml. of benzene were added to the mixture, the whole being brought to the boil while nitrogen was fed in, the water being distilled-off as an azeotrope.

After 4 hours the water was separated quantitatively. The benzene was then distilled off, the dipotassium salt of diphenylether-4,4'-dithiol remaining behind dissolved in the N-methylpyrrolidone. After the mixture had been cooled to room temperature, 14.15 g. (0.06 mol) of p-dibromobenzene, O.5. g. of copper-(I)-oxide, and 16 ml. of N-methylpyrrolidone were added, followed by heating for 4 hours at 150° C. under nitrogen.

The viscous, somewhat yellowish solution was poured into water, causing the polymer to separate as a somewhat yellowish, hard mass. It was comminuted and extracted with water. The titrated, split-off bromine in the collected extract amount to 99.6% of the theoretical value. The polymer was dried for 12 hours in a high vacuum at 140° C. The red. spec. viscosity was 0.49 (in N-methylpyrrolidone, 0.2 g./100 ml. of solvent).

EXAMPLE 2

The procedure was as in Example 1, except that instead of caustic potash, 24.53 ml. of aqueous LiOH (11.72%, 0.12 mol) was used. Poly-condensation was carried out with a catalyst. After the p-dibromobenzene was added, the reaction mixture was heated to 195° and was stirred for 9 hours at this temperature. The red. spec. viscosity was 0.47. The polymer melted at about 240°.

EXAMPLE 3

16.71 g. (0.06 mol) of the disodium salt of diphenyl ether 4,4'-dithiol, 8.82 g. (0.06 mol) of p-dichlorobenzene, and 46 ml. of N-methylpyrrolidone were stirred for 10 hours at 200° C. in a glass autoclave under a nitrogen atmosphere. The somewhat yellow-brown viscous solution was placed in water after cooling. This caused the polymer to solidify into a hard, white mass. The splitting off of chlorine was quantitative. After the usual processing, a red. spec. viscosity of 0.63 was measured.

EXAMPLE 4

The procedure was as in Example 1, except that 4,4'-dibromodiphenylether was used instead of p-dibromobenzene. The red. spec. viscosity of the polymer obtained was 0.43. It melted at 210–220° C.

The embodiments of the invention in which an exclusive property or privilege is claimed are defined as follows:

1. A method for producing a heat-resistant, linear, thermoplastic, aromatic polythioether polymer having the formula

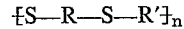

wherein R and R' are bivalent residues of aromatic compounds and $n$ is a whole number; which method comprises reacting an alkali metal salt of a dinuclear aromatic dithiol having the formula

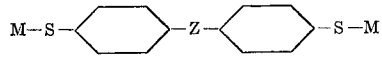

wherein M is Li, Na or K, and Z is —O—, —S—, —CH$_2$— or —C(CH$_3$)$_2$— with a single or multiple nuclear aromatic dihalogene compound having at least 3 carbon atoms between the halogen atoms, said aromatic dihalogen compound further having no electron attracting group present, in N-methyl pyrrolidone, sulfolane (tetrahydro thiophen-1,1-dioxide), dimethylacetamide, hexamethyl phosphoramide, or dimethyl sulphoxide, and at a temperature of 180–300° C. to form a solution of said polymer, said reaction being with exclusion of water and in the presence of a catalyst, said catalyst being copper, copper oxide, copper acetate, copper bromide, copper iodide, N-bromo-succinimide or N-bromo-phthalamide.

2. A method according to claim 1 wherein said catalyst is present in an amount of 0.05–3.0% by weight based on the weight of the dithiol.

3. A method according to claim 1 in which the catalyst is copper.

4. A method according to claim 1 in which the catalyst is copper oxide.

5. A method according to claim 1 in which the catalyst is N-bromo-phthalamide.

6. A method according to claim 1 in which the catalyst is N-bromo-succinimide.

References Cited

UNITED STATES PATENTS

| | | | |
|---|---|---|---|
| 2,822,351 | 2/1958 | Kreuchunas | 260—79.3 |
| 3,098,103 | 7/1963 | Reifschneider | 260—609 |
| 3,332,909 | 7/1967 | Farnham et al. | 260—47 |
| 3,432,468 | 3/1969 | Gabler | 260—47 |

DONALD E. CZAJA, Primary Examiner

M. I. MARQUIS, Assistant Examiner

U.S. Cl. X.R.

260—61, 79, 79.1